United States Patent [19]

Heimsoth et al.

[11] Patent Number: 5,454,078
[45] Date of Patent: Sep. 26, 1995

[54] SYSTEM FOR SHARING NAME AMONG NETWORK ADAPTERS BY, DYNAMICALLY LINKING ADAPTERS HAVING SAME LOGICAL NAME AND MAINTAINING LINKED STATE OF REMAINING ADAPTERS

[75] Inventors: Daniel D. Heimsoth, Austin, Tex.; Brent T. Hoegh, Byron, Minn.; Gary T. Hunt, Austin, Tex.

[73] Assignee: International Business Machines Corporation, Armonk, N.Y.

[21] Appl. No.: 926,876

[22] Filed: Aug. 7, 1992

[51] Int. Cl.⁶ ........................................ G06F 13/00
[52] U.S. Cl. .................. 395/200.1; 395/650; 395/829; 364/242.94; 364/238.5; 364/940.1; 364/DIG. 1
[58] Field of Search .................. 395/200, 275, 395/700, 575, 650, 725, 800, 500; 364/242.94, 238.5, 286.2, 284.4, 284.3, 281.6, 282.2, 940.1, 975.2; 370/60, 94.1, 16, 85.13, 85.2, 85.6, 95.1; 371/11.1, 15.1

[56] References Cited

U.S. PATENT DOCUMENTS

| | | | |
|---|---|---|---|
| 4,768,149 | 8/1988 | Konopik et al. | 364/200 |
| 4,771,286 | 9/1988 | Niessen et al. | 340/825.52 |
| 4,823,338 | 4/1989 | Chan et al. | 370/85 |
| 4,831,620 | 5/1989 | Conway et al. | 370/85 |
| 4,837,788 | 6/1989 | Bird | 375/3 |
| 4,887,075 | 12/1989 | Hirasawa | 340/825.03 |
| 4,930,159 | 5/1990 | Kravitz et al. | 380/23 |
| 4,967,348 | 10/1990 | Naito et al. | 364/200 |
| 5,109,484 | 4/1992 | Hughes et al. | 395/200 |
| 5,161,102 | 11/1992 | Griffin et al. | 364/200 |
| 5,206,936 | 4/1993 | Holland et al. | 395/200 |
| 5,235,639 | 8/1993 | Chevalier et al. | 364/200 |
| 5,237,690 | 8/1993 | Bealkowski et al. | 395/700 |
| 5,257,378 | 10/1993 | Sideserf et al. | 395/700 |
| 5,280,588 | 1/1994 | D'Ambrose et al. | 395/275 |
| 5,301,276 | 4/1994 | Kimura | 395/275 |
| 5,319,770 | 6/1994 | Lehman | 395/275 |

*Primary Examiner*—Thomas C. Lee
*Assistant Examiner*—Moustafa M. Meky
*Attorney, Agent, or Firm*—Mark S. Walker; Keith Stephens

[57] ABSTRACT

A method, system and process for allowing identical server names on a computer system to be shared between multiple LAN adapters. A processor, under the control of the process, prompts a user for entry of a new adapter name. The adapter name is used to build a name query which is transmitted to a local area network (LAN) to determine if the adapter name is already in use by the same computer. If the adapter name is in use by the same computer, then the new adapter is linked to the existing adapter with the same name. However, if no response is received after an appropriate number of retry attempts, then the name is added to the local table of LAN adapter names. When the computer receives traffic addressed to a shared name, the process ensures that only one adapter at a time responds. The responsibility for responding to this traffic is transferred to all adapters sharing this name. This technique results in distribution of workload across multiple adapters and a resultant increase in throughput realized by spreading the load of LAN requests across multiple LAN adapters.

9 Claims, 9 Drawing Sheets

FIG. 7

Parameters for IBM OS/2 NETBIOS

Edit the parameters as needed. Except for parameters preceded by "*", changes affect all instances of the driver.

| Parameter | Value |
|---|---|
| Type of Ethernet driver support | 1 |
| Universally administered address reversed | YES |
| Maximum sessions | 40 |
| Maximum commands | 95 |
| Maximum names | 21 |
| GDT selectors | 5 |
| Full buffer datagrams | NO |
| Adaptive windowing interval | 1000 |
| Window errors | 0 |

[OK] [Cancel] [Range] [Help]

5,454,078

SYSTEM FOR SHARING NAME AMONG NETWORK ADAPTERS BY, DYNAMICALLY LINKING ADAPTERS HAVING SAME LOGICAL NAME AND MAINTAINING LINKED STATE OF REMAINING ADAPTERS

FIELD OF THE INVENTION

This invention generally relates to improvements in a Local Area Network (LAN) and more particularly to allowing identical server names to be shared between multiple LAN adapters.

BACKGROUND OF THE INVENTION

LAN application management has become the subject of significant recent interest, not only because of the popularity of low cost LAN communication links for personal computers but also because of the ready made access via a LAN to many application programs. Until this invention, it was impossible for LAN applications to have multiple LAN adapters connected to a single network on a single computer system identically named. Rather, each adapter required a unique name.

U.S. Pat. No. 4,930,159 entitled, Netbios Name Authentication, disclosed a method and system for insuring that names are not used illegally on a local area network. The Netbios protocols use a naming system that allows any station or set of names that are not already in use, by claiming the name when the real user is not connected to the network. This patent clearly shows the prior art approach of requiring unique names for devices attached to a LAN. However, there is no disclosure of shared names for LAN adapters on a single computer system or on the same network.

SUMMARY OF THE INVENTION

Accordingly, it is a primary object of the present invention to allow identical server names on a computer system to be shared between multiple LAN adapters.

These and other objects of the present invention are accomplished by the operation of a process in the memory of a processor. The processor, under the control of the process, prompts a user for entry of a new adapter name. The adapter name is used to build a name query which is transmitted to a local area network (LAN) to determine if the adapter name is already in use. If the adapter name is in use, then the new adapter is linked to the existing adapter with the same name. However, if no response is received after an appropriate number of retry attempts, then the name is added to the local table of LAN adapter names. When the computer receives traffic addressed to a shared name, the process ensures that only one adapter at a time responds. The responsibility for responding to this traffic is transferred to all adapters sharing this name. This technique results in distribution of workload across multiple adapters and a resultant increase in throughput realized by spreading the load of LAN requests across multiple LAN adapters.

BRIEF DESCRIPTION OF THE DRAWINGS

FIG. 7 is an illustration of the panel used to edit IBM OS/2 NETBIOS parameters in accordance with the subject invention;

DETAILED DESCRIPTION OF THE INVENTION

Figure 1:
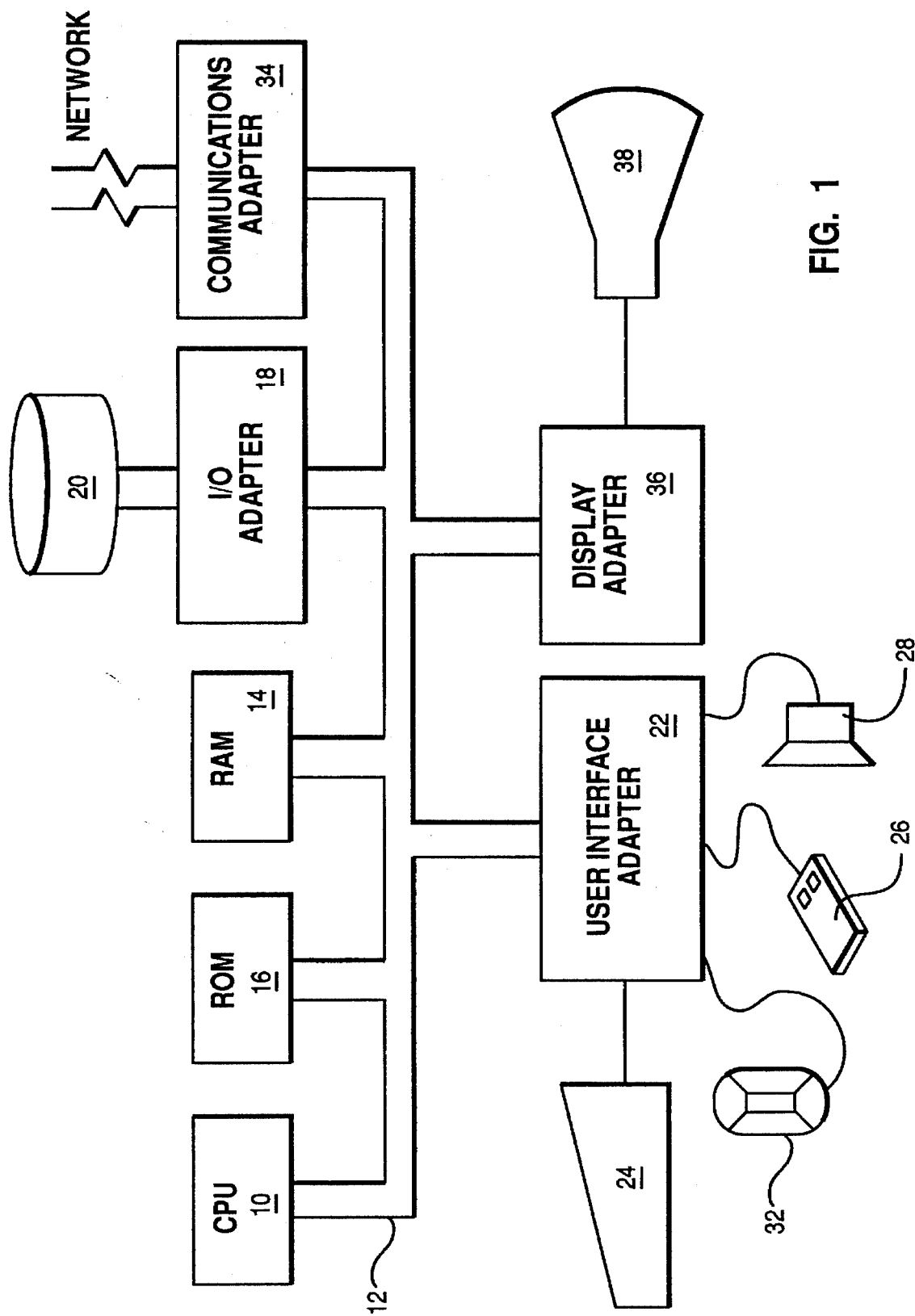
FIG. 1 is a block diagram of a host computer in accordance with the subject invention.

A representative hardware environment is depicted in FIG. 1, which illustrates a typical hardware configuration of a workstation in accordance with the subject invention having a central processing unit 10, such as a conventional microprocessor, and a number of other units interconnected via a system bus 12. The workstation shown in FIG. 1 includes a Random Access Memory (RAM) 14, Read Only Memory (ROM) 16, an I/O adapter 18 for connecting peripheral devices such as disk units 20 to the bus, a user interface adapter 22 for connecting a keyboard 24, a mouse 26, a speaker 28, a microphone 32, and/or other user interface devices such as a touch screen device (not shown) to the bus, a communication adapter 34 for connecting the workstation to a data processing network and a display adapter 36 for connecting the bus to a display device 38.

The preferred embodiment of the subject invention is an IBM Personal System/2 with the IBM OS/2 operating system installed. Detailed descriptions of the hardware and software environment are provided in PS/2 Hardware Interface Technical Reference, S10G-6457, IBM Corporation (1991), and OS/2 Presentation Manager Programming, SC28-2700, IBM Corporation (1992). While the invention will be described in terms of this hardware and software, one skilled in the art will recognize that other operating systems and hardware can be supported without undue experimentation. Also resident on the computer system is the OS/2 LAN System Software support including the software making up the subject invention. The system software used in the previous release is described in the following publications available from IBM and incorporated herein in their entirety by reference. IBM Operating System/2 Local Area Network Server Version 2.0 Information and Planning Guide (G236-0162); IBM Local Area Network Server Programs (Specification Sheet) (G360-2753); and IBM Local Area Network Technical Reference (SC30-3383).

LAN Transport Architecture for OS/2

Figure 2:
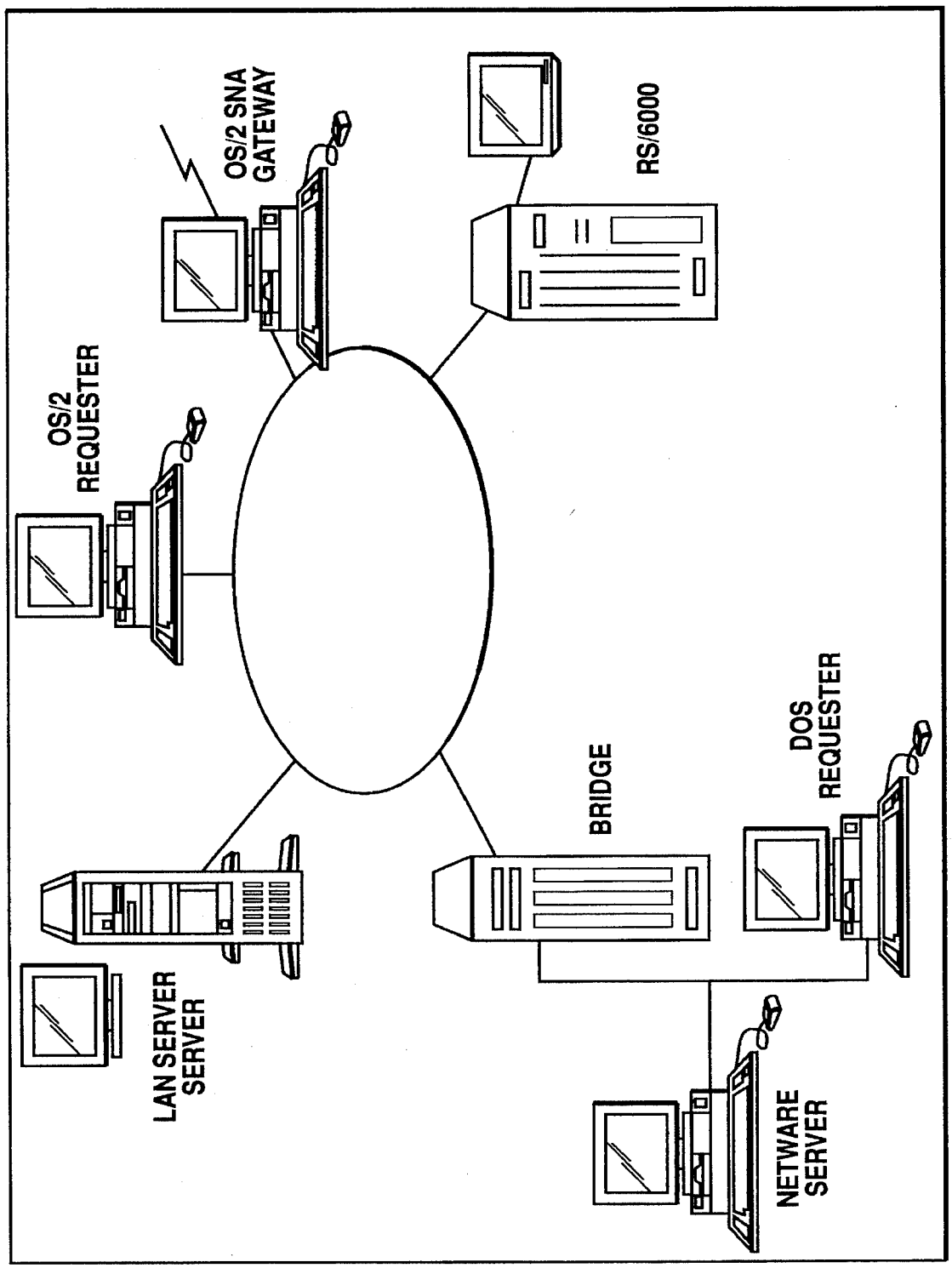
FIG. 2 is an illustration of an interconnected comber environment in accordance with the subject invention.
Figure 3:
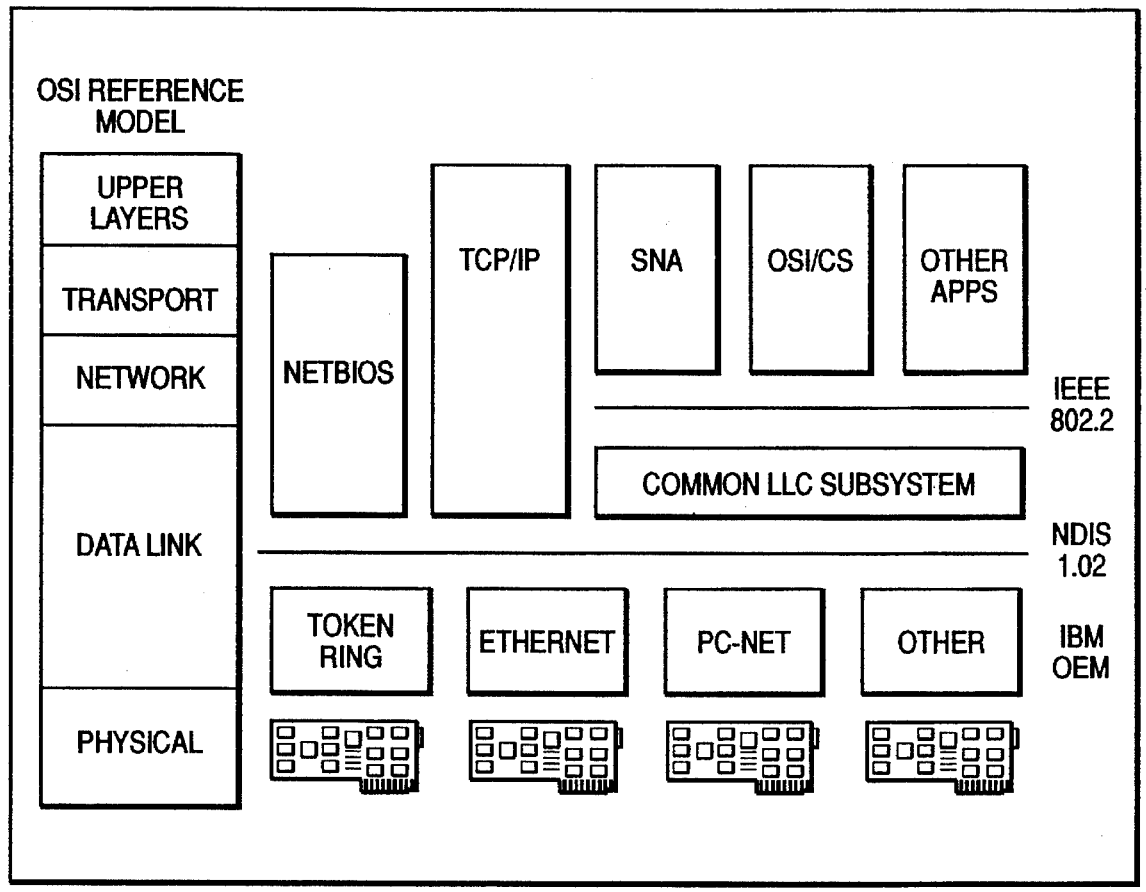
FIG. 3 is a block diagram of the LAN transport architecture under OS/2 in accordance with the subject invention.

Interconnected computing environments are becoming much more prevalent. Network environments are becoming more varied, consisting of different LAN technologies, multiple vendors and multiple adapters. There is also a higher performance requirement and a greater need for an increased number of connections to servers and network management. FIG. 2 is an illustration of a typical computer network environment comprising a plurality of interconnected workstations similar to that shown in FIG. 1. FIG. 3 represents the various applications that are run in an interconnected network environment in accordance with the subject invention.

LAN Transport Architecture for OS/2 2.0

Figure 4:
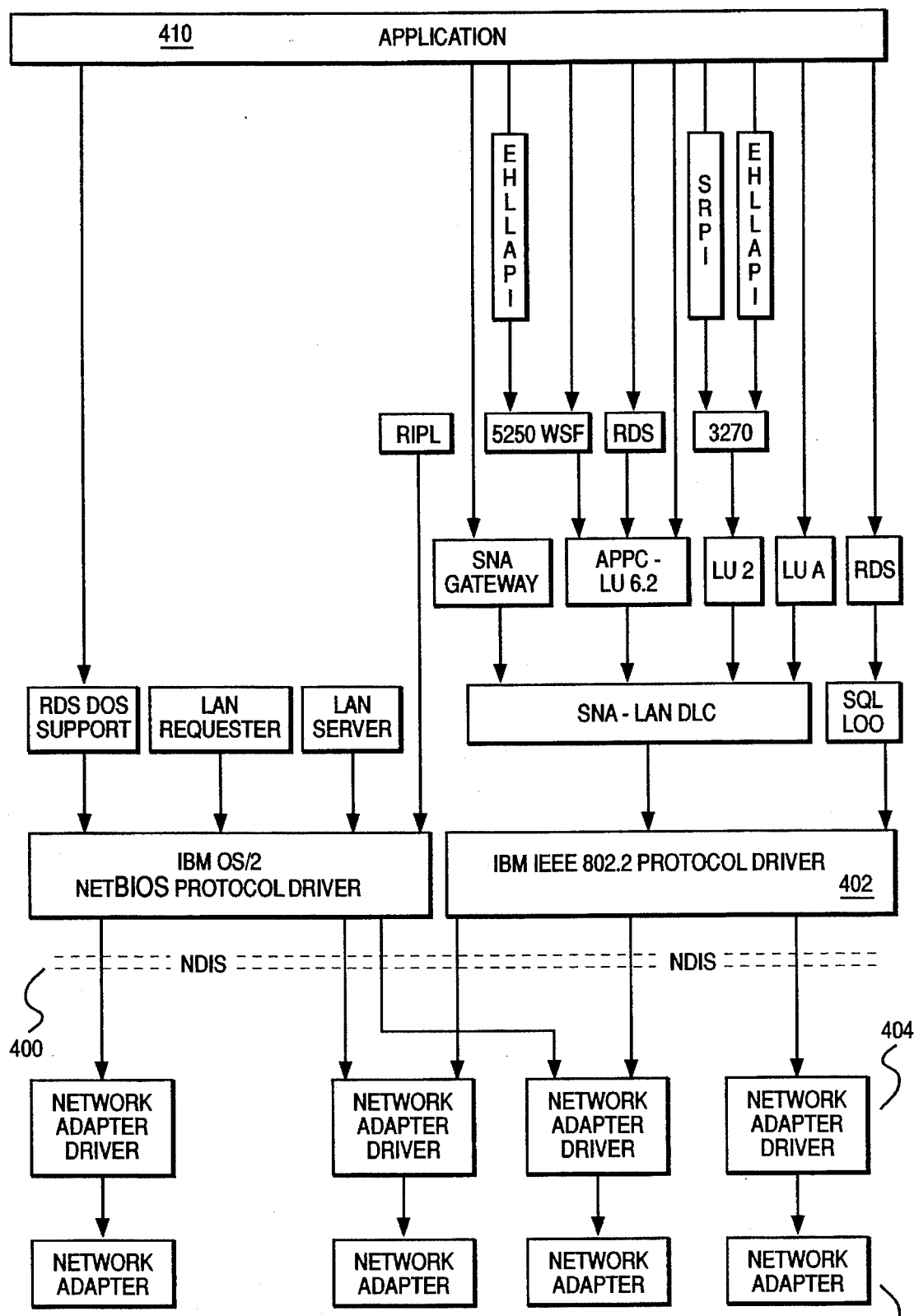
FIG. 4 is a block diagram of the LAN Adapter and Protocol Support for OS/2 2.0 in accordance with the subject invention.

LAN adapter and Protocol Support (LAPS) consists of the network communication software necessary to support LAN connectivity. LAPS is a combination of Network Driver Interface Specification (NDIS) compliant protocol drivers, NDIS compliant network adapter drivers, Application Program Interface (API) support software, and configuration and installation software for the drivers. The IBM Network Basic Input / Output (NETBIOS) has been extended to interface to NDIS and to the 802.2 specification. A complete description of the 802.2 communication standard is available in International Standard (ISO) 8802-2 (1989). FIG. 4 is a block diagram of the LAN Adapter and Protocol Support for OS/2 2.0 in accordance with the subject invention.

NDIS Support

NDIS 400 is a standardized Medium Access Control (MAC) interface for network adapter drivers and protocol drivers. NDIS has become an industry standard for network adapters and LAN software to communication with each other. NDIS separates protocol handling from hardware manipulation by defining functions that protocol drivers 402 and network adapter drivers 404 must provide to each other. NDIS defines specifications for network protocol drivers, adaptor drivers, an interface between network protocol drivers and adapter drivers and a binding process to link the protocol and adaptor drivers.

A network protocol driver 402 provides the communication between an application 410 and a network adapter driver 404. A network adaptor driver 404 or MAC driver provides the communication between a network adapter and a protocol. The main function of the network adapter driver is to support network packet reception and transmission. Both types of NDIS drivers have the same modular structure. Each driver has an upper boundary and a lower boundary. The drivers are linked together to form a stack by binding the lower boundary of one driver to the upper boundary of another driver. The MAC driver at the bottom of the stack always has its lower boundary connected to the physical layer—the network adapter hardware 406.

Figure 5:
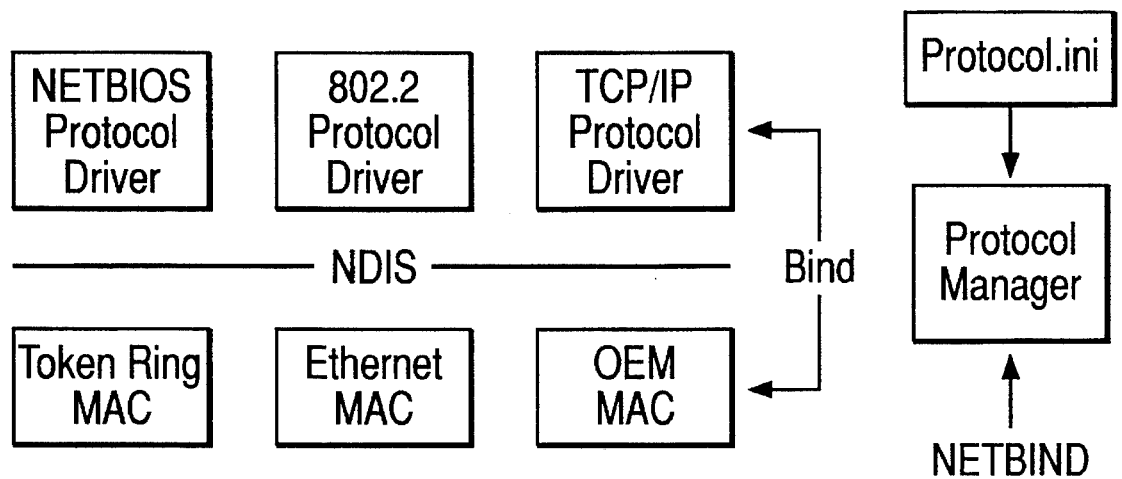
FIG. 5 illustrates the major software components in the NDIS environment.

The NDIS specification published jointly by 3COM and Microsoft entitled, LAN Manager Network Driver Interface Specification, dearly defines the binding process of the drivers. Three components are used to form and manage the protocol stack from individual drivers. The three components in the OS/2 2.0 environment are: PROTOCOL.INI; PROTMAN.OS2; and NETBIND.EXE. FIG. 5 illustrates the major software components in the NDIS environment.

LAPS Configuration and Binding Process

Figure 6:
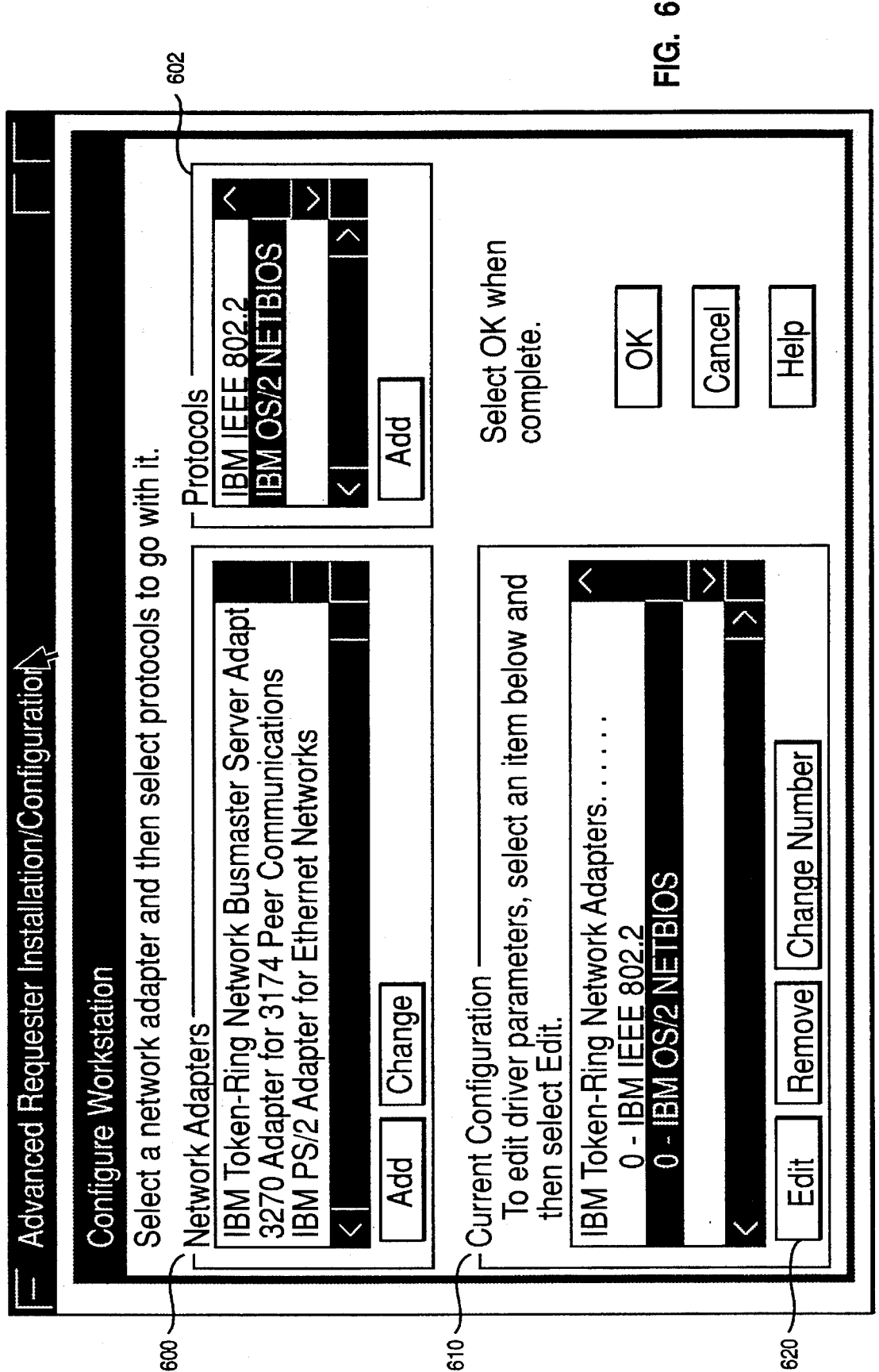
FIG. 6 illustrates a display for the installation and configuration of LAN adapter and Protocol Support (LAPS) in accordance with the subject invention.

An OS/2 Presentation Manager interface is provided to aid in creating correct CONFIG.SYS and PROTOCOL.INI files. FIG. 6 illustrates a display for the installation and configuration of LAPS. A network adapter 600 is selected from the list box, and protocols 602 from the list box are selected to bind to the adapters. Current configuration 610 shows which protocols have been bound to which adapters. FIG. 6 is an illustration of an IBM Token Ring Adapter being defined to support both NETBIOS and IEEE 802.2.

Network Information File

Figure 8:
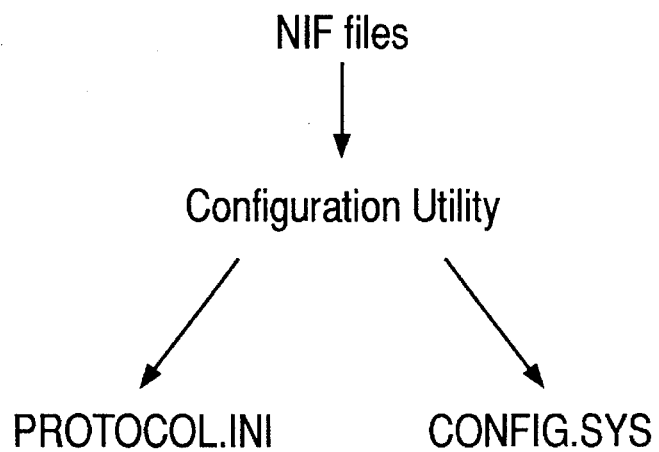
FIG. 8 illustrates the part the Configuration Utility plays in installation and configuration of network protocol and adapter drivers in accordance with the subject invention.

Values for various protocols may be edited by selecting a protocol driver and then Edit 620 from the Current Configuration list box. Valid ranges for parameters are provided by a Network Information File (NIF). FIG. 7 is an illustration of the panel used to edit IBM OS/2 NETBIOS parameters. NIFs contain the configurable items that are displayed in the LAPS configuration windows. Each driver—both protocol and adapter—must have a NIF which contains a set of default values, ranges for the parameter values, and other information associated with a driver. The LAPS configuration utility installation program copies the NIFs to a workstation. FIG. 8 illustrates the part the Configuration Utility plays in installation and configuration of network protocol and adapter drivers.

PROTOCOL.INI File

PROTOCOL.INI is a file containing the NDIS configuration information for network adapter drivers and protocol drivers for a workstation. The file contains three sections: Protocol Manager, MAC or Network Adapter Driver, and Network Protocol Driver. Attached below is a modified example of a PROTOCOL.INI file.
driverName=PROTMAN$
The first entry is the Protocol Manager, the driver which controls the binding process.
[IBMLXCFG]
IBMTOK nif=IBMTOK.NIF
LANDD nif=LANDD.NIF
NETBEUI nif=NETBEUI.nif
Defining the NIF files
[LANDD nif]
DriverName=LANDD$
Bindings=IBMTOK nif
[NETBEUI nif]
DriverName=netbeui$
Bindings=IBMTOK nif
This section is for the protocol driver. The Bindings= parameter specifies the module name of the driver with which the protocol should attempt to bind. This parameter determines which drivers will be bound together to form the protocol stack or stacks. In the example above, the LLX subsystem (802.2) and NetBIOS (NETBEUI) are bound to the driver for a Token Ring Card.
[IBMTOK nif]
DriverName=IBMTOK$
MAXTRANSMITS=12
RECVBUFS=2
RECVBUFSIZE=256
XMITBUFS=1
This section defines the network adapter driver, in this case a token ring card.

Linking Shared Names

The LAN enabling logic discussed above is used to initialize the LAN and its associated adapters in preparation for use of the inventive techniques. To allow LAN adapters to share names, it is required to provide a new facility for adding names to the list of adapters available to the network. The ADD.NAME process in existing NetBIOS protocol (described in chapter 5 of the LAN Technical Reference) broadcasts an ADD.NAME.QUERY frame on the network which contains the name being added. For the standard NetBIOS protocol, when an ADD.NAME.QUERY frame is received for a name that has already been added to receiving adapter, an ADD.NAME.RESPONSE frame is sent back to prevent the other adapter from adding that name.

Figure 10:
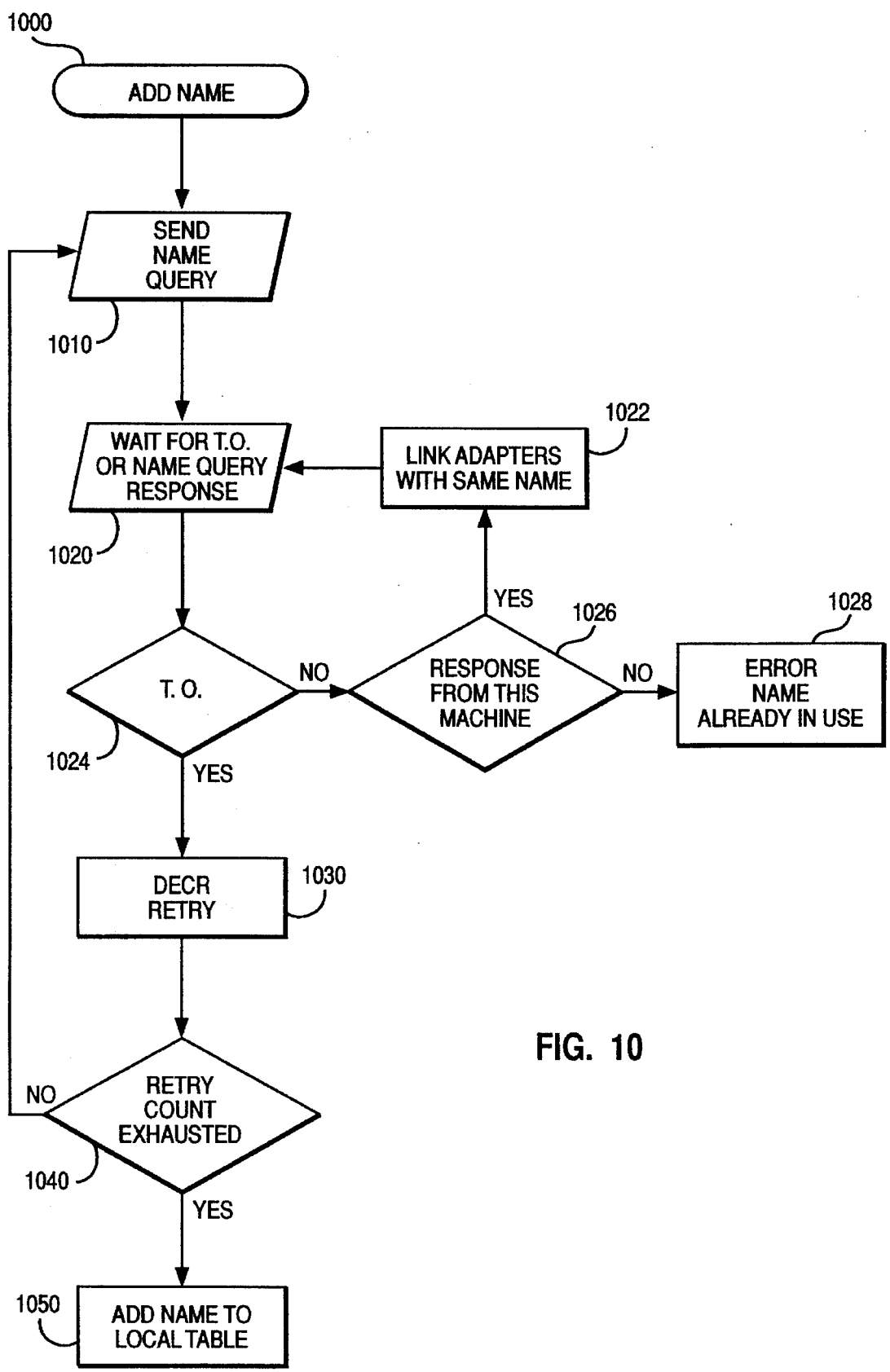
FIG. 10 is a detailed flowchart of the ADD NAME function block in accordance with the subject invention.

For the Name Sharing enhancement, detailed in FIG. 10, when an ADD.NAME.QUERY frame is received for a name that has already been added to a receiving adapter, a check is made of all the other adapters in the system to determine if the query originated from one of them. If the check finds the query came from a matching name on one of the other adapters, the NAME data area for the name/adapter pair sending the query is marked to indicate the name is shared and a shared-linkage pointer field in the data area is set to point to the NAME data area for the name/adaptor pair that received the query. The NAME data area for the name/adapter pair that received the query is also marked to indicate the name is shared, although it may already be marked shared if it is already sharing that name with other adaptors in the system. The shared-linkage pointer fields in the NAME data areas will form a circular queue which contains all the NAME data areas for all adapters sharing that name. Then, when the name is accessed for any one of the adapters, it is possible to reference all the other adaptors sharing the name by following the queue pointers.

Figure 9:
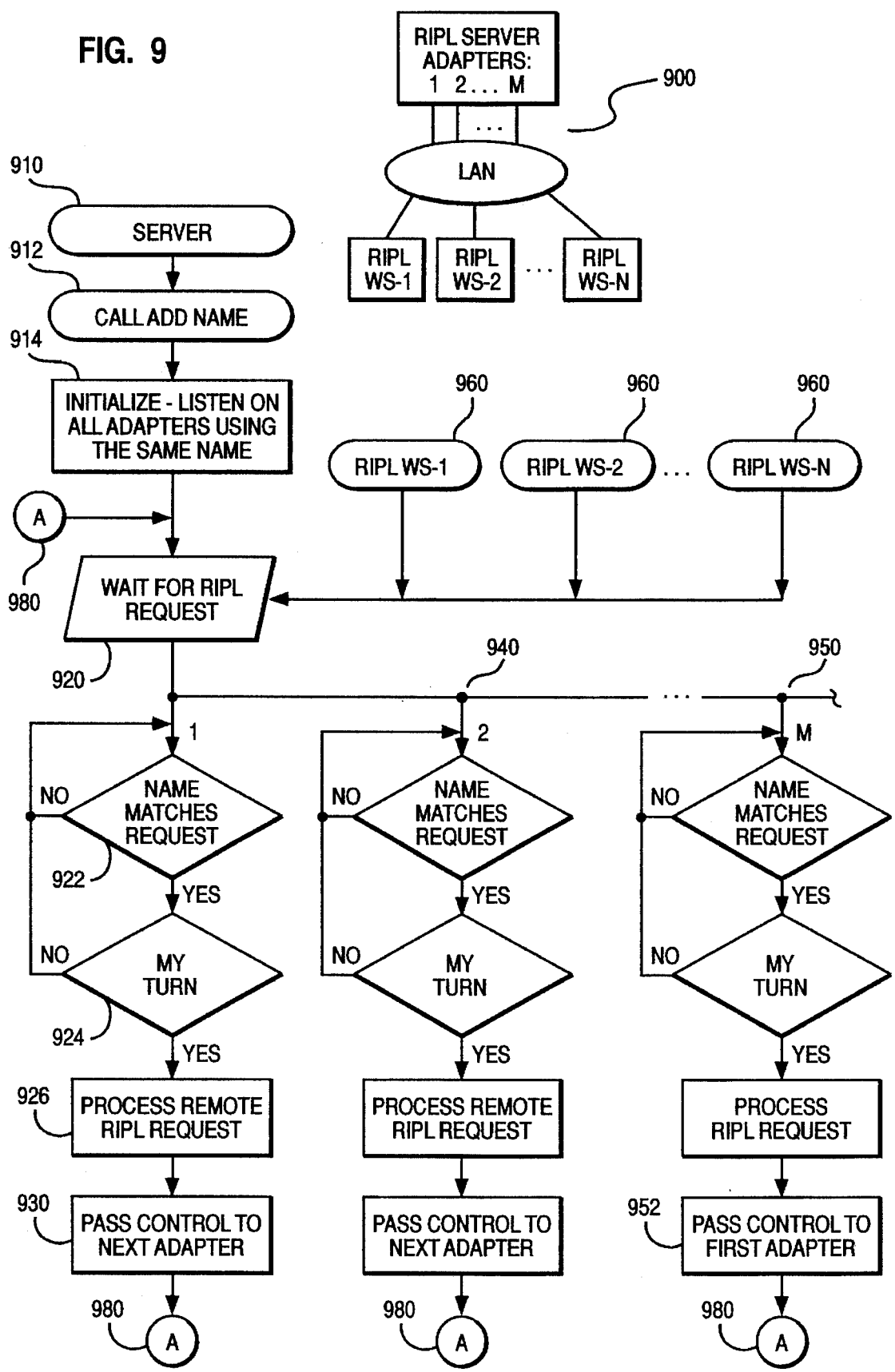
FIG. 9 is a flowchart of one example of the use of the subject invention for Remote Initial Program Load (RIPL) in accordance with the subject invention.

A flow chart of remote Initial Program Load (IPL) employing the subject invention is set forth in FIGS. 9 and 10. An example of a LAN topology is presented at the top of FIG. 9 at label 900. Processing commences at the terminal entry point 910 and flows to the Add Name 912 function block which is detailed in FIG. 10. Then, in function block 914, the LAN adapters are initialized using the same name, and a wait stato is entered in I/O Block 920 for a remote IPL request. Remote IPL requests can be processed for any of a plurality of workstation shown at terminal 960.

When an RIPL request is detected at block 920, processing commences to service the particular request. The processing commences with a check to see if the particular name matches a request at decision block 922, 940 and 950. If no match is found at any of the match tests, then the request is ignored. However, if a match is detected at 922, then another test is performed at decision block 924 to determine if the particular adapter is the current, active adapter. If the adapter is active, then the remote IPL is processed over the adapter associated with the matched name as shown in function block 926 and detailed in the LAN Technical Reference. Then, control is passed to the next adapter for processing requests currently pending for that adapter as shown in function block 930 and control is ultimately returned via terminal 980 to input block 920 to await the next RIPL. When the computer receives traffic addressed to a shared name, the process ensures that only one adapter at a time responds. The responsibility for responding to this traffic is transferred to all adapters sharing this name. Processing is the same for each of the adapters with the exception of function block 952 of the last adapter which passes control to the first adapter when processing is completed.

While the flow chart teaches a sequential transfer of control from the first adapter to the last adapter, one of ordinary skill in the art will recognize that various techniques can be substituted for the sequential processing. These include first come first serve processing and balancing the workload between the various adapters. The flexibility which this processing creates also provides the ability to service more than 255 adapters for a single computer system and provide better performance than was previously available.

FIG. 10 is a detailed flowchart of the logic associated with adding a name for an adapter in accordance with the subject invention. Processing commences at terminal 1000 and immediately flows to output block 1010 where a name query is sent out to the various adapters connected to the system. Then, at input block 1020, the system enters a wait state for a time out or name query response. When the response is received, then processing passes to decision block 1024 to determine if a timeout has occurred. If a timeout has occurred, then the retry is decremented in function block 1030, a test is performed at decision block 1040 to determine if the retry count is exhausted and control passes back for another try at block 1010.

If no timeout has occurred at decision block 1024, then if a response has been received from the same computer as detected at decision block 1026, then the adapters with the same name are linked together as shown in function block 1022 and control is returned to input block 1020 to await any other adapter's response. If the response is not from this computer as detected at decision block 1026, then an error is reported at function block 1028. Also, if the retry count has been exhausted at decision block 1040, then the name is added to the local table at function block 1050. +v,1-32/2

While the invention has been described in terms of a preferred embodiment in a specific system environment, those skilled in the art recognize that the invention can be practiced, with modification, in other and different hardware and software environments within the spirit and scope of the appended claims.

Having thus described our invention, what we claim as new, and desire to secure by Letters Patent is:

1. An apparatus for installing a first network adapter in a computer connected to one or more networks, the network adapter having a logical name shared with a second adapter in the computer, comprising:

(a) means for requesting network allocation of a logical name for a first adapter in the computer, said logical name accessible to at least one other computer on said one or more networks;

(b) means for requesting network allocation of a second logical name for a second adapter in the computer, said second logical name accessible to at least one other computer on said one or more network;

(c) means for receiving a network response to said means for requesting a second logical name;

(d) means for querying the computer to determine if any adapter has the same logical name as the logical name selected for the second adapter, if the received response indicates a logical name conflict;

(e) means for linking the adapters to share the same logical name if the same names are selected if the means for querying determines that the logical name is in use by the same computer;

(f) means for storing the logical name and the linked state of the adapters if said means for linking links logical names; and (g) means for removing one or more network adapters and maintaining the linked state of the remaining network adapters.

2. Apparatus as recited in claim 1, including means for installing a plurality of network adapters.

3. Apparatus as recited in claim 1, including means for supporting a plurality of Local Area Network Adapters.

4. Apparatus as recited in claim 3, including means for performing a remote initial program load over the plurality of Local Area Network Adapters.

5. Apparatus as recited in claim 1, including:
(a) means for ensuring only one network adapter responds to each service request; and
(b) means for passing control to the linked adapters.

6. A method for installing a first network adapter in a computer attached to a network with a logical name shared with a second network adapter in the computer, comprising the steps of:
(a) defining a logical name for a first adapter in the computer, said logical name accessible to at least one other computer on said network;
(b) defining a logical name for a second adapter in the computer, said logical name accessible to at least one other computer on said network;
(c) querying the network to determine whether the second logical name conflicts with any network assigned names;
(d) querying the computer to determine if any network adapter has the same logical name as the logical name selected for the second network adapter;
(e) linking the network adapters if the same logical names are selected;
(f) storing the logical name and the linked state of the adapters; and
(g) optionally removing one or more network adapters and maintaining the linked state of the remaining network adapters.

7. A method as recited in claim 6, including the step of installing a plurality of network adapters.

8. A method as recited in claim 6, including the step of supporting a plurality of Local Area Network Adapters.

9. A method as recited in claim 8, including the step of performing a remote initial program load over the plurality of Local Area Network Adapters.

* * * * *